(12) United States Patent
Feldstein et al.

(10) Patent No.: US 9,096,924 B2
(45) Date of Patent: Aug. 4, 2015

(54) COMPOSITE PTFE PLATING

(71) Applicant: SURFACE TECHNOLOGY, INC., Trenton, NJ (US)

(72) Inventors: Michael David Feldstein, Princeton, NJ (US); Thomas S. Lancsek, Trenton, NJ (US)

(73) Assignee: SURFACE TECHNOLOGY, INC., Robbinsvile, NJ (US)

( * ) Notice: Subject to any disclaimer, the term of this patent is extended or adjusted under 35 U.S.C. 154(b) by 0 days.

(21) Appl. No.: 14/062,321

(22) Filed: Oct. 24, 2013

(65) Prior Publication Data

US 2014/0178577 A1 Jun. 26, 2014

Related U.S. Application Data

(63) Continuation of application No. 13/032,022, filed on Feb. 22, 2011, now Pat. No. 8,598,260.

(51) Int. Cl.
| | |
|---|---|
| *C23C 18/31* | (2006.01) |
| *C23C 18/34* | (2006.01) |
| *C23C 18/16* | (2006.01) |
| *C09D 127/18* | (2006.01) |

(52) U.S. Cl.
CPC .......... *C23C 18/1662* (2013.01); *C09D 127/18* (2013.01); *C23C 18/31* (2013.01); *C23C 18/34* (2013.01)

(58) Field of Classification Search
USPC .................................................. 524/546, 80
See application file for complete search history.

(56) References Cited

U.S. PATENT DOCUMENTS

| | | | | |
|---|---|---|---|---|
| 6,306,466 | B1 * | 10/2001 | Feldstein et al. | 427/437 |
| 8,598,260 | B2 * | 12/2013 | Feldstein et al. | 524/401 |
| 2009/0169875 | A1 * | 7/2009 | Endo et al. | 428/336 |
| 2011/0077338 | A1 * | 3/2011 | Feldstein et al. | 524/404 |
| 2012/0021120 | A1 * | 1/2012 | Feldstein | 427/8 |

FOREIGN PATENT DOCUMENTS

JP 2006-287148 * 10/2006

* cited by examiner

*Primary Examiner* — Peter D Mulcahy
*Assistant Examiner* — Henry Hu
(74) *Attorney, Agent, or Firm* — Gottlieb Rackman & Reisman PC

(57) ABSTRACT

The present invention is directed to compositions, baths, and methods for composite plating including polytetrafluoroethylene (PTFE), and more particularly, to compositions, baths, and methods of composite plating with PTFE in a metal or alloy matrix where the materials used in the process contain no or essentially no PFOS (perfluorooctane sulfonate) and/or no PFOA (perfluorooctanoic acid).

11 Claims, No Drawings

COMPOSITE PTFE PLATING

This application is a continuation of U.S. patent application Ser. No. 13/032,022, filed Feb. 22, 2011, and now U.S. Pat. No. 8,598,260. The content of this application is incorporated by reference in its entirety.

BACKGROUND OF THE INVENTION

The present invention relates in general to composite plating, composite plating compositions, articles plated in such compositions, and more particularly, to a process of composite plating with polytetrafluoroethylene (PTFE) in a metal or alloy matrix where the materials used in the process contain no or essentially no PFOS (perfluorooctane sulfonate) and no PFOA (perfluorooctanoic acid).

The electroless plating of articles or substrates with a composite coating containing finely dispersed particulate matter is well documented.

Electroless plating generally involves the deposition of metal alloys by chemical or electrochemical reduction of aqueous metal ions. Through such deposition, the process of electrolessly metallizing a desired metal coating over an article or substrate is achieved.

The fundamentals of composite electroless plating are documented in a text entitled "Electroless Plating Fundamentals and Applications," edited by G. Mallory and J. B. Hajdu, Chapter 11, published by American Electroplaters and Surface Finishers Society (1990), which is herein incorporated by reference.

As opposed to conventional electroless plating methods, in composite electroless plating, insoluble or sparingly soluble particulate matter is intentionally introduced into a bath solution for subsequent co-deposition onto a substrate or article as a coating.

Early patents related to composite electroless plating include U.S. Pat. No. 3,644,183 (Oderkerken), in which a structure of composite electroless plating with finely divided aluminum oxide was interposed between electrodeposited layers to improve corrosion resistance. U.S. Pat. Nos. 3,617,363 and 3,753,667 (Metzger et al.) utilized a great variety of particles and miscellaneous electroless plating baths. Thereafter, Christini et al., in Reissue Pat. No. 33,767, further extended the composite electroless plating technique to include the co-deposition of diamond particles. All of the foregoing references are herein incorporated by reference.

The co-deposition of particles in composite electroless plating can dramatically alter or enhance existing characteristics and even add entirely new properties. These capabilities have made composite electroless coatings advantageous for a variety of reasons including, but not limited to, increased utility in conditions requiring less wear and lower friction; facilitating the use of new substrate materials such as titanium, aluminum, lower cost steel alloys, ceramics, and plastics; allowing higher productivity of equipment with greater speeds, less wear, and less maintenance related downtime; and replacing environmentally problematic coatings such as electroplated chromium which is a significantly toxic metal.

In addition, commercially viable composite electroless coatings are essentially homogenous, uniform or regenerative, meaning that their properties are maintained even as portions of the coating are removed during use. This feature results from the uniform manner with which the particles are dispersed throughout the entire plated layer.

Commercially viable composite electroless, and conventional electroless plating processes with particles, must operate at certain levels of performance in a number of parameters. Such parameters include: plating rate of the plating bath, surface area of immersed workpieces able to be plated per volume of the plating bath, stability of the plating bath, ability to replenish the plating bath with continued used of the plating bath, lifetime of the plating bath, usually described in terms of metal turnovers, and other parameters.

Coating products using composite plating, especially metalized plating and, more particularly, electroless nickel with PTFE, has come into widespread commercialized use around the world in many industries such as high speed components, automotive applications, molds, electronic connectors, textile manufacturing components, material handling devices, machining and tooling parts, cookware and other food handling equipment, and others.

Composite plating with PTFE is accomplished by adding appropriate amounts of a dispersion containing PTFE particles into the plating bath generally containing a metal such as electroless nickel. The PTFE dispersion is formulated to break up any agglomerates, such as of PTFE, resulting from the manufacture of the PTFE and encapsulate the PTFE particles with certain chemicals that allow the PTFE to be introduced and function properly in the plating bath.

However, in recent years, health and environmental concerns have been raised about the inclusion of certain materials in PTFE dispersions, including PFOS and PFOA, that are used in composite plating systems. In particular, some materials in PTFE dispersions become included in the plating, and these materials later migrate from the plated objects into or onto other items, including humans and animals. For example, PTFE is used in plating cookware and, at times, small quantities of the plating material, including PTFE and any materials in the PTFE plating, may be absorbed by the foods prepared in the cookware. Another example is in components used in consumer and industrial products such as automotives, electronics, and others which may ultimately be disposed and the disposition may lead to exposure or transfer of the PFOA or PFOS into the environment.

According to the United States Environmental Protection Agency, "Perfluorooctanoic acid (PFOA), also known as "C8," is a synthetic chemical that does not occur naturally in the environment. It has special properties that have many important manufacturing and industrial applications. The EPA has been investigating PFOA because PFOA is very persistent in the environment, is found at very low levels both in the environment and in the blood of the general U.S. population, remains in people for a very long time, and causes developmental and other adverse effects in laboratory animals. Major pathways that enable PFOA, in very small quantities, to get into human blood are not yet fully understood. PFOA is used to make fluoropolymers and can also be released by the transformation of some fluorinated telomers. However, consumer products made with fluoropolymers and fluorinated telomers, including Teflon® and other products, are not PFOA. Rather, some of them may contain trace amounts of PFOA and other related perfluorinated chemicals as impurities. The information that the EPA has available does not indicate that the routine use of consumer products poses a concern. At present, there are no steps that EPA recommends that consumers take to reduce exposures to PFOA. In 2006, EPA and the eight major companies in the industry launched the 2010/15 PFOA Stewardship Program, in which companies committed to reduce global facility emissions and product content of PFOA and related chemicals by 95 percent by 2010, and to work toward eliminating emissions and product content by 2015."

In addition, the United States Environmental Protection Agency states that, "In January 2005, the EPA Office of Pollution Prevention and Toxics submitted a Draft Risk Assessment of the Potential Human Health Effects Associated With Exposure to Perfluorooctanoic Acid and Its Salts (PFOA) to the EPA Science Advisory Board (SAB) for formal peer review. EPA sought this early stage scientific peer review from an outside panel of experts in order to ensure the most rigorous science is used in the Agency's ongoing evaluation of PFOA. That draft was preliminary and did not provide conclusions regarding potential levels of concern. The SAB reviewed the information that was available at the time, and suggested that the PFOA cancer data are consistent with the EPA Guidelines for Carcinogen Risk Assessment descriptor "likely to be carcinogenic to humans."

Regarding Perfluorooctane sulfonate (PFOS), The Organization for Economic Cooperation and Development has stated that "Sufficient information exists to address hazard classification for all SIDS [Screening Information Data Set] human health endpoints. PFOS is persistent, bioaccumulative and toxic to mammalian species. There are species differences in the elimination half-life of PFOS; the half-life is 100 days in rats, 200 days in monkeys, and years in humans. The toxicity profile of PFOS is similar among rats and monkeys. Repeated exposure results in hepatotoxicity and mortality; the dose-response curve is very steep for mortality. This occurs in animals of all ages, although the neonate may be more sensitive. In addition, a 2-year bioassay in rats has shown that exposure to PFOS results in hepatocellular adenomas and thyroid follicular cell adenomas; the hepatocellular adenomas do not appear to be related to peroxisome proliferation. Further work to elucidate the species differences in toxicokinetics and in the mode of action of PFOS will increase our ability to predict risk to humans. Epidemiologic studies have shown an association of PFOS exposure and the incidence of bladder cancer; further work is needed to understand this association. Sufficient information exists to address hazard classification for all SIDS environmental endpoints. PFOS is persistent in the environment and has been shown to bioconcentrate in fish. It has been detected in a number of species of wildlife, including marine mammals. Its persistence, presence in the environment and bioaccumulation potential indicate cause for concern. It appears to be of low to moderate toxicity to aquatic organisms but there is evidence of high acute toxicity to honey bees. No information is available on effects on soil- and sediment-dwelling organisms and the equilibrium partitioning method may not be suitable for predicting PNECs [Predicted No Effect Concentrations] for these compartments. PFOS has been detected in sediment downstream of a production site and in effluents and sludge from sewage treatment plants."

The United States Environmental Protection Agency is also actively investigating the levels of contamination of PFOS in the environment from the land to water supplies, animals, animal products such as milk, and its effect on animal and human health.

Specifically, it is desirable to reduce or eliminate PFOA and PFOS from such systems.

Accordingly, there is still an unsolved need for further improvements in composite PTFE plating solutions and methods, whereby PFOS and PFOA are eliminated or greatly reduced.

BRIEF SUMMARY OF THE INVENTION

The present invention is directed to compositions, baths, and methods for composite plating including PTFE, but absent or at trace amounts of PFOA and/or PFOS. PTFE is an especially difficult material to incorporate into plating baths and subsequently into coatings. The properties that make PTFE non-stick also make PTFE particles difficult to wet and combine with the surfactants that apply a charge to the particle. This charge is the means by which the particles are dispersed into the plating solution without substantial agglomeration and allow them to be co-deposited into the coating.

The inclusion of insoluble particulate matter in composite electroless baths introduces additional instability. To overcome the extra instability due to the addition of insoluble particulate matter to the bath, as described in U.S. Pat. No. 6,306,466, the general use of particulate matter stabilizers (PMS) is believed to isolate the finely divided particulate matter, thereby maintaining the particular matter's "inertness". Also, particulate matter stabilizers tend to modify the charge on the particulate matter to further maintain inertness. Altogether, by a precise addition and type of particulate matter stabilizers one may overcome the instability issues directly related to the addition of insoluble particulate matter to the plating baths, as shown in U.S. Pat. Nos. 4,997,686, 5,145,517, 5,300,330, 5,863,616 and 6,306,466.

In electroless plating systems, the PTFE particles are dispersed with a combination of surfactants into a dispersion product. Commercially available dispersions are generally about sixty percent by volume PTFE solids. One or more of the surfactants used to date in such dispersions are fluorocarbon materials that contain PFOS.

All composite PTFE plating solutions and methods known in the art, including the art referenced above, knowingly or unknowingly incorporate PFOS in the plating process. Specifically, PFOS is included in one or more of the surfactants or particulate matter stabilizers that are used to disperse PTFE particles and make them compatible with the plating process. PFOS has historically been used because the surfactants or particulate matter stabilizers most readily available, common in the composite plating field, and effective for this application contain PFOS. PFOS containing materials have been the industry standard in such PTFE dispersions and plating baths due to the high level of stability which the PFOS material provides to both the PTFE dispersion alone and to the performance of the composite plating bath using PTFE from such dispersions. PFOS is a molecule containing eight carbon atoms and sixteen fluorine atoms. The electronegativity of the fluorine atom helps a surfactant adsorb onto particles such as PTFE. Shorter carbon chain surfactants contain fewer fluorine atoms and are therefore less effective than an eight chain PFOS surfactant. For example, a six carbon chain surfactant contains only twelve fluorine atoms as there are two fluorine atoms for every one carbon atom. For the purposes of this discussion, a surfactant is meant to include all varieties of surfactants, wetting agents, dispersants, particulate matter stabilizers and like materials. A surfactant with less electronegativity than provided in a PFOS surfactant will be less able or impossible to adsorb onto PTFE particles. A modified dispersion formulation and/or process may be needed to get a surfactant with less electronegativity than PFOS to adsorb onto PTFE particles, if it is even possible, with equal strength. Surfactants with less electronegativity include fluorocarbon surfactants with less than eight carbon atoms, hydrocarbon surfactants, and others. If the surfactants used in the dispersion of the PTFE particles have less electronegativity than that provided by PFOS, and the adsorption onto the PTFE is weaker than what it would be with a PFOS surfactant, the PTFE dispersion will be less stable, meaning that the PTFE will be more prone to settling, floating, or otherwise de-wetting, and hence not being a stable dispersion able to handle shelf life, storage, transportation, temperature changes in the above. Such a dispersion would also not be in suitable condition for use in a plating bath. In the plating bath, stability of the PTFE from a dispersion using surfactants with less electronegativity than PFOS surfactants can also be lower, and hence exhibit drawbacks or failures such as the de-wetting of PTFE particles in the plating bath. De-wetting of the PTFE particles in the plating bath is most commonly witnessed by the PTFE particles agglomerating within the plating bath and/or floating on top of the surface of the plating bath. Factors such as high temperatures, chemistry, and agitation make the PTFE particles more likely to de-wet in the plating bath. Naturally, if the PTFE particles float, agglomerate or otherwise de-wet in the plating bath, these particles will not be useful in the plating bath for codeposition as desired onto an article. Adding more PTFE dispersion into a plating bath to compensate for de-wetted particles is a costly and likely ineffective option as the newly introduced PTFE particles are likely to also de-wet, and the additional PTFE dispersion introduced to the plating bath may negatively affect the performance of the plating bath.

PFOA is a polymerization aid used in the manufacture of PTFE, and some concentration of PFOA is generally included in PTFE used in plating. Use of PFOA as a polymerization aid in the manufacture of PTFE has certain significant influences and advantages in PTFE dispersions in composite plating baths, and on articles produced from such plating baths.

When the PTFE particles are produced, they are produced with PFOA as a polymerization aid. It is possible however to modify the process of PTFE manufacturing to produce PTFE with essentially no, or no PFOA, and to then create a dispersion of the PTFE particles essentially free or free of PFOA. Some manufacturers of PTFE have been able to reduce the PFOA content of their PTFE products suitable for PTFE dispersions to trace levels. Other manufacturers have programs in place to do the same to eliminate or essentially eliminate PFOA in their PTFE.

The formulations and methods of producing PTFE dispersions established in the field of composite plating have been based on the properties of PTFE particles manufactured with PFOA as a polymerization aid. As has been discussed, the dispersion and use of such PTFE dispersions in composite plating is a sensitive balance requiring significant adsorption of surfactants onto PTFE particles which are not readily wetable. The type, composition, charge, particles size, degree of agglomeration, surface area, and other factors are essential in the degree of stability or instability of the PTFE particles within a dispersion and/or plating bath. Moreover, the coordination between the quantity, combinations, and charges of the surfactants and the type, composition, charge, particles size, degree of agglomeration, surface are, and other factors of the PTFE particles is essential to the ultimate stability and utility of the PTFE in the dispersion and/or plating bath. Any alteration to one of the materials may require adjustment to some or all of the other parameters, if even possible, to still produce an effective product, process, and article from such a process. In terms of PFOA specifically, its use as a polymerization aid affects the composition of the PTFE, the base particle and/or agglomerate size of the PTFE material. PTFE particles manufactured with less or no PFOA require different surfactants, combinations of surfactants and/or methods of dispersion in order to make such PTFE suitable for use in a dispersion and subsequent plating bath.

E.I. du Pont de Nemours and Company is a leader in the manufacture of PTFE, and has begun replacing the use of PFOA in the manufacture of PTFE with another material known as GenX. Gen X has the following chemical structure: $CF_3CF_2CF_2OCF(CF_3)COOH.NH_3$. Other products similar to Gen X in that they are usable in PTFE plating and do not include PFOA have also recently begun to appear in the marketplace.

PFOA and PFOS have recently become the topic of health and environmental concerns. These materials have been found to not decompose over time and are believed to have negative health and environmental impacts. Both materials have been found in human and animals' blood around the world, and it is a concern that these materials persist without decomposing. Terms like biocumulative and biopersistent have been used to describe PFOA and PFOS.

Users of PFOA containing PTFE dispersion have begun testing non-PFOA containing PTFE dispersions in order to avoid any possible long terms issues related to the presence of PFOA.

PFOS containing materials are used on an even broader scale than just composite plating. Other applications include fume and fire suppression, sealers, and others.

The 3M Company, a major manufacturer of products containing PFOS, discontinued its manufacture in the year 2000 of PFOS chemicals.

The United States Environmental Protection Agency had ruled that PFOS may not be manufactured or imported into the United States. United States companies may still use existing supplies of PFOS as long as the PFOS is not newly manufactured or imported into the United States. However, it is clear that the avoidance of PFOS and PFOA is a desirable and prudent goal given the concerns over these materials, and considering that they may eventually be banned from use as well as manufacture and importation to the United States.

Therefore, an object of the present invention is PTFE dispersions useful in composite plating where these dispersions are free or essentially free of PFOA and/or PFOS.

In accordance with one embodiment of the present invention, there is described a process of electrolessly metallizing an article to provide on its surface a metal coating containing PTFE particulate matter, in which the PTFE dispersion and electroless metallizing bath are essentially free of PFOA and PFOS.

In accordance with another embodiment of the present invention, there is described an article with a coating, in which the coating contains an electroless metal and PTFE particulate matter, and is free or essentially free of PFOA and PFOS.

In accordance with another embodiment of the present invention, there is described a plating bath, process, and article produced by such a bath and/or process that contain the material known as GenX with the chemical structure: $CF_3CF_2CF_2OCF(CF_3)COOH.NH_3$.

DETAILED DESCRIPTION OF THE INVENTION

In describing the preferred embodiments of the present invention, specific terminology will be resorted to for the sake of clarity. However, the invention is not intended to be limited to the specific terms so selected, and is to be understood that each specific term includes all technical equivalences which operate in a similar manner to accomplish a similar purpose.

In the practice of the present invention, a PTFE dispersion is formulated by adding together PTFE particulate matter, one or more surfactants, and other ingredients as needed.

In the practice of the present invention, the PTFE particulate matter is free of PFOA, or substantially free of PFOA, as traces of PFOA exist in many materials, and therefore the present invention relates to products with as little PFOA as possible according to material availability and limitations of detection by the prevailing analytic methods.

The removal of PFOA from the manufacture of PTFE powder by the manufacturers of PTFE requires a significant alteration of their process of manufacturing. The resulting PTFE powder consequently also has different properties. PTFE produced by different methods of manufacture not only have different compositions of PTFE, PFOA and other materials, but depending on which method of manufacture is used to produce PTFE the process can have other physical affects on the resulting PTFE and therefore change the stability of the PTFE particles within the plating bath, specifically their ability to remain wet and dispersed in the plating bath without agglomerating, floating or otherwise de-wetting and therefore not being present in proper form and concentration to codeposit onto the immersed article in the plating bath and form the desired coating. At times, different PTFE-based plating baths may behave differently as a consequence of the PTFE powder manufacturing process. For example, the method of manufacture of PTFE influences the basic particle size, particle agglomeration, surface area of the PTFE material, and other physical properties. Such properties and others affected by the method of manufacture of the PTFE with reduced or no PFOA has implications for the use of such PTFE in dispersions useful for plating applications. Alteration of the chemistry and method of manufacture of such dispersions in order to utilize PTFE free or essentially free of PFOA in such dispersions is therefore required, especially to produce such dispersions that meet the highest standards of commercial practice. Further, because of extensive differences and inconsistencies in non-PFOA (or limited PFOA) PTFE particle manufacture, properties of plating baths using these PTFE particles, such as regenerability, lifetime, and stability, have wide variability and there is a need for a cost effective and repeatable plating bath and plating process to overcome these variabilities.

Dispersions of PTFE useful in the present invention are intended to have the desirable properties of uniform particle size, minimal agglomeration, stability in storage, compatibility with the parameters and process of use.

Further, PFOS when used in PTFE plating processes, associates with the metal/PTFE coating, is included in the plated material, and, like PFOA, exhibits migration characteristics akin to those of PFOA.

For health and environmental reasons akin to those regarding PFOA, there is a desire to eliminate or greatly reduce PFOS in plating. In the practice of the present invention, the PTFE dispersion may be free of PFOS, or substantially free of PFOS, as traces of PFOS exist in many materials, and therefore the present invention shall relate to products with as little PFOS possible according to material availability and limitations of detection by the prevailing analytic methods. In general, trace amounts as the term is used herein are those in which the concentration of PFOS in a bath are less than 13.25 parts per million or 0.4 parts per thousand in the PTFE dispersion.

PFOS may be introduced into PTFE dispersions through the use of certain surfactant materials. Fluorocarbon surfactants have been widely used in the manufacture of PTFE dispersions. The surfactants that have been most commonly used in this field have been surfactants with a chain of eight carbon atoms, known as perfluoro-octyl, or PFOS. Such eight chain molecules are generally less soluable than other fluorocarbon surfactants with shorter chains of carbon atoms or other types of surfactants. These eight chain carbon molecules therefore tend to be more stable. This feature relates to the effectiveness experienced in the art with such eight carbon chain molecules. This feature also directly relates to a problem with such eight carbon chain based fluorocarbon surfactants as such surfactants bioaccumulate to a greater degree than fluorocarbon surfactants with shorter chains of carbon atoms or other varieties of surfactants.

In addition to the bioaccumulation of PFOS from such fluorocarbon surfactants which is viewed as problematic for the environment, PFOS has further been suspected of causing developmental and systemic toxicity in laboratory animals. This therefore being an additional concern making the avoidance of PFOS advantageous.

It is therefore an object of the present invention to form PTFE dispersions using surfactants free or essentially free of PFOS in commercially viable PTFE dispersions.

It is also an object of the present invention to manufacture PTFE dispersions free of fluorocarbon surfactants in general as even fluorocarbon surfactants with carbon chains less than eight may still be more problematic to the environment, humans, and/or animals than non-fluorocarbon surfactants. In one embodiment of the present invention, certain types and quantities of hydrocarbon surfactants may be used as a replacement for fluorocarbon surfactants. It is an object of the present invention to use only hydrocarbon surfactants in PTFE dispersions, and it is further an object of the present invention to use a combination of hydrocarbon and fluorocarbon surfactants in PTFE dispersions.

The difficulty in using hydrocarbon surfactants instead of some or all fluorocarbon surfactants in a PTFE dispersion is that hydrocarbon surfactants have a much weaker covalent bond between the carbon and hydrogen atoms compared to the bond between carbon and fluorine atoms in fluorocarbon surfactants. Further, by nature, the greater electronegativity of fluorine compared to hydrogen, the lesser the electronegativity of a hydrocarbon surfactant inherently makes a hydrocarbon surfactant less effective in adsorbing onto PTFE particles to provide the desired stability of PTFE within a dispersion and/or plating bath.

It is also an object of the present invention to manufacture dispersions including PTFE particles plus particles of another material.

It is also an object of the present invention to manufacture dispersions of particles of materials other than PTFE. Other lubricating, low friction, and release enabling particles would be considered under the present invention. Particles with other properties including, but not limited to, wear resistance, friction, heat transfer, insulating, conductivity, phosphorescent, medicinal, aesthetic, and other properties would also be considered under the present invention.

The PTFE dispersion may be used for composite plating (electroless, electrolytic, immersion, brush and other varieties), anodizing, topical treatments using PTFE, other surface treatments, or any application where PTFE particulate matter is needed in a dispersed form.

In plating applications, the metal or alloy matrix may be applied through an electroless, electrolytic or other methods. The metal or alloy may be selected from suitable metals capable of being deposited. Such metals include, without limitation, nickel, cobalt, copper, gold, palladium, iron, other transition metals, and mixtures thereof, and any of the metals deposited by the autocatalytic process in Pearlstein, F., "Modern Electroplating", Ch. 31, $3^{rd}$ Ed., John Wiley & Sons, Inc. (1974), which is incorporated herein by reference. Preferably, the metals are nickel, cobalt and copper.

Such metals may be introduced to the plating bath within a compound that aids and allows the dissolution of the metal portion in the bath solution. Such compounds may include without limitation, sulfates, chlorides, acetates, phosphates, carbonates, sulfamates, and hypophosphites.

In electroless plating processes, reducing agents are used as electron donors. When reacted with the free floating metal ions in the bath solution, the electroless reducing agents reduce the metal ions, which are electron acceptors, to metal for deposition onto the article. The use of a reducing agent avoids the need to employ a current, as required in conventional electroplating. Common reducing agents are sodium hypophosphite, nickel hypophosphite, sodium borohydride, n-dimethylamine borane (DMAB), n-diethylamine borane (DEAB), formaldehyde, and hydrazine.

The PTFE particulate matter may be in any suitable form. Generally the PTFE may be from nanometers in size up to approximately 100 microns in size. The specific preferred size range depends on the application involved.

In order to formulate a PTFE dispersion free or essentially free of PFOA and/or PFOS, any known particulate matter stabilizers (PMSs) may be used in the PTFE dispersion so long as it is free or essentially free of PFOA and/or PFOS. Such PMSs are well-known, and include, without limitation, sodium salts of polymerized alkyl naphthalene sulfonic acids, disodium mono ester succinate (anionic, cationic, and non-ionic groups which may be used alone, or in combination), fluorinated alkyl polyoxyethylene ethanols, tallow trimethyl ammonium chloride, dispersants, wetting agents, surfactants, and any of the PMSs, or any other materials, disclosed in U.S. Pat. No. 6,306,466, except those which are not free or essentially free of PFOS and/or PFOA, which is incorporated herein by reference. However, the choice of PMS can result in a non-commercially viable PTFE dispersion, whereas other choices may result in a commercially viable PTFE dispersion in particular concentrations or when additional compounds are introduced to the bath. For example, the use of one or more PMSs, alone or in combination, can cause coagulation, separation, solidification, and other deficiencies in the composition of a PTFE dispersion. Moreover, the use of one or more PMSs may cause deficiencies in the electroless metalizing bath, even if the appearance of the PTFE dispersion appears acceptable. For example, the use of one or more PMSs, alone or in combination, may cause the PTFE particles to separate from the electroless metalizing bath immediately or with time, heat, chemical reactions, etc., to agglomerate, settle, float, or otherwise not remain properly dispersed in the electroless metalizing bath. Further, the use of one or more PMSs, alone or in combination, may cause performance deficiencies in the electroless metalizing bath such as reduced plating rate, reduced bath life, reduced tolerance to agitation, increased consumption of materials especially the PTFE dispersion in the electroless metalizing bath.

In the case of composite electroless PTFE plating, the electroless metallizing bath, depending upon whether the PTFE dispersion is free or essentially free of PFOS and/or PFOA, may also contain one or more complexing agents and the agents may be of different types and different concentrations. More than one complexing agent may be needed. The complexing agent acts as a buffer to help control pH and maintain control over the "free" metal salt ions in the solution, all of which aids in sustaining a proper balance in the bath solution. Some of these complexing agents are, without limitation, lactic, malic, succinic, hydroxyacetic, acetic, ammonium compounds, citric.

In some cases, the electroless metallizing bath may further contain a pH adjuster to also help control pH levels in the bath. Suitable pH adjusters include, without limitation, carbonates, hydroxides, and acids that buffer at a desired pH range. Some of these pH adjusters are, without limitation, ammonium hydroxide, sodium hydroxide, potassium carbonate, ammonium bicarbonate, ammonium carbonate, and sulfuric acid. Again, the use and quantity of a pH adjuster depends on the acidity of the bath, which is based at least in part on the PTFE dispersion and the complexing agents used.

The article to be coated may require preliminary preparation prior to this contact. This preparation includes the removal of surface contaminants. For example, this process may involve degreasing, alkaline cleaning, electrocleaning, water or solvent rinsing, acid activation, pickling, ultrasonic cleaning, physical modification of the surface, vapor or spray treatments, etc.

The mechanism by which a coating is formed on an article in composite electroless plating is well known in the art. For example, U.S. Pat. No. 4,830,889, which is incorporated herein by reference, describes the electroless reaction mechanism. Generally, metal ions are reduced to metal by action of chemical reducing agents, which are electron donors. The metal ions are electron acceptors that react with the electron donors. The article to be coated itself may act as a catalyst for the reaction. The reduction reaction results in the deposition of a coating with the metal (or electroless metal) onto the surface of the article.

The article to be coated may be any substrate or material capable of being coated through composite electroless plating. Some examples of such articles are components in high wear, abrasive, impact, cutting, grinding, molding, frictional, and sliding applications.

Once completed, this electroless plating process results in an article with a coating containing metal or metal alloy and PTFE particulate matter but free or essentially free of PFOA and/or PFOS. In this regard, increasingly stringent rules and regulations that restrict or prohibit the use of certain materials, such as the End-Of-Life Vehicle (ELV) Regulations and Restriction of Certain Hazardous Substances (RoHS), means that the present invention has an extra added benefit. These regulations are designed to reduce the presence of certain materials with health and/or environmentally problematic qualities in articles. Because particulate matter stabilizers and other materials can stabilize the plating bath as well and overcome the increase in instability inherent from adding insoluble or sparingly soluble particulate matter, use of the present invention complies with such regulations because it does away with the need for potentially costly and certainly environmentally regulated materials in composite electroless plating, which thereby avoids the incorporation of such hazardous materials in the articles plated in such baths.

Generally, the electroless metal in the deposited coating is a metal or a metal alloy, usually in the form of a metal, a metal and phosphorous, or a metal and boron. The metal or metal alloy is derived from the metal salt used in the bath. Examples of the metal or metal alloy are nickel, nickel-phosphorous alloy, nickel-boron alloy, cobalt, cobalt-phosphorous alloy, and copper.

Specifically, "electroless" nickel is an alloy of 88-99% nickel and the balance with phosphorous, boron, or a few other possible elements. Electroless nickel is commonly produced in one of four alloy ranges: low (1-4% P), medium (6-8% P), or high (10-12% P) phosphorous, and electroless nickel-boron with 0.5-3% B. Each variety of electroless nickel thus provides properties with varying degrees of hardness, corrosion resistance, magnetism, solder-ability, brightness, internal stress, and lubricity. All varieties of electroless nickel can be applied to numerous articles, including metals, alloys, and nonconductors.

Electroless nickel is produced by the chemical reaction of a nickel salt and a reducing agent. Typical electroless nickel baths also include one or more complexing agents, buffers, brighteners when desirable, and various stabilizers to regulate the speed of metal deposition and avoid decomposition of the solution that is inherently unstable. Diligent control of the solution's stabilizer content, pH, temperature, tank maintenance, loading, and freedom from contamination are essential to its reliable operation. Electroless nickel baths are highly surface area dependent. Surface areas in contact with the bath include the tank itself, in-tank equipment, immersed substrates, and contaminants. Continuous filtration, often submicron, of the solution at a rate of at least ten turnovers per hour is generally recommended to avoid particulate contamination which could lead to solution decomposition or imperfections in the plated layer.

The following examples demonstrate an electroless plating process of the present invention, in which PTFE particulate matter and a metal alloy matrix is plated onto an article.

The plating rate (i.e., the rate at which a plated coating deposits from the plating bath onto the article being plated) is measured by the thickness of coating achieved per unit of time. Microns or mils per hour are common measures of plating rate. As shown in the following examples, the plating rate was not shown to decrease due to the addition of particulate matter to an electroless plating bath. Instead, the plating rate of electroless metallizing coatings essentially free of heavy metals shows an increase over the standard plating rate of those same coatings containing heavy metals in some instances. At the very least, the examples show that such plating without the intentional introduction of heavy metals results in successful deposition of a coating, an indication that the plating bath was stabilized without the use of heavy metals, and a plating rate that either matched the plating rate of plating with the intentional introduction of heavy metals or exceeded it. As a reference, the "standard plating rate" in the examples refers to the plating rates for conventional composite electroless plating for the particular coating deposited in each example, in which the bath used includes intentionally introduced heavy metals. For example, regarding a composite electroless nickel/PTFE bath that includes intentionally introduced heavy metals, the plating rate is commonly about 10 microns per hour.

Example 1

Medium Phosphorous Nickel-PTFE without PFOA or PFOS

Dry PTFE particulate matter that is essentially free of PFOA (i.e., understood in the art to be at most only trace amounts of PFOA in the PTFE) was dispersed into an aqueous solution containing a mixture of PMSs that do not contain PFOS, resulting in a PTFE dispersion that is free of PFOA and PFOS.

This PTFE dispersion was introduced into a medium phosphorous type electroless nickel composite plating bath in the amount of 6 grams of dispersion per liter of plating bath. The bath included a nickel salt providing a nickel metal concentration of 6 grams per liter in the plating bath, a reducing agent of sodium hypophosphite at a concentration of 30 grams per liter, and other components typical of electroless nickel baths, but free or essentially free of any PFOA or PFOS. The plating bath was operated at the parameters of pH 4.8-5.0, temperature of 90 degrees Celsius, and mild stirring agitation.

A steel panel measuring 2 cm by 5 cm was prepared by an immersion in a hot (180 degrees Fahrenheit) alkaline cleaning solution for 10 minutes, rinse in water, immersion in a fifty percent by volume concentration of hydrochloric acid in water at 70 degrees Fahrenheit for 1 minute, rinse in water, and then immersion in the plating bath of the present invention at the parameters disclosed above. After 60 minutes of plating in this plating bath the panel was removed from the plating bath. The surface of the coating appeared as a uniform coated surface with a silver-gray color. The coating on the panel was analyzed as follows.

A photomicrograph of a cross section of this coating at 1000-x magnification demonstrated a coating thickness of about 9 microns. Chemically dissolving the coating and weighing the PTFE incorporated in the coating compared to the weight and volume of the entire coating demonstrated about 19% of PTFE by volume in the coating.

The above bath representing the present invention was maintained at the conditions and parameters above for the subsequent plating of additional steel panels until the plating bath reached a total usage of 3 metal turnovers during which the plating rate remained essentially consistent, the PTFE in the plating bath remained well dispersed and did not exhibit any agglomeration, floating, or other signs of de-wetting; and the properties of the coating on these additional panels was consistent with the initial example, thereby demonstrating that the present invention is reproducible and commercially viable to an equal extent as the current state of the art yet free or essentially free of PFOA and PFOS.

Example 2

The same PTFE dispersion as in Example 1 above was introduced into a new but identical composite electroless nickel plating bath in the amount of 10 grams of dispersion per liter of plating bath. The plating bath was operated at the same parameters as Example 1 of pH 4.8-5.0, temperature of 90 degrees Celsius, and mild stirring agitation.

A steel panel identical to Example 1 above was prepared according to the same procedure as Example 1 above, and immersed into the second plating bath. After 60 minutes of plating in this plating bath the panel was removed from the plating bath. The coating on the panel was analyzed as follows.

A photomicrograph of a cross section of this coating at 1000-x magnification demonstrated a coating thickness of about 9 microns. Chemically dissolving the coating and weighing the PTFE incorporated in the coating compared to the weight and volume of the entire coating demonstrated about 28% of PTFE by volume in the coating.

Example 3

High Phosphorous Nickel-PTFE without PFOA or PFOS

Dry PTFE particulate matter that is essentially free of PFOA (i.e. understood in the art to be at most only trace amounts of PFOA in the PTFE) was dispersed into an aqueous solution containing a mixture of PMSs that do not contain PFOS, resulting in a PTFE dispersion that is free of PFOA and PFOS.

This PTFE dispersion was introduced into a high phosphorous type electroless nickel composite plating bath in the amount of 6 grams of dispersion per liter of plating bath. The bath included a nickel salt providing a nickel metal concentration of 6 grams per liter in the plating bath, a reducing agent of sodium hypophosphite at a concentration of 30 grams per liter, and other components typical of electroless nickel baths, but free or essentially free of any PFOA or PFOS. The plating bath was operated at the parameters of pH 4.8-5.0, temperature of 90 degrees Celsius, and mild stirring agitation.

A steel panel measuring 2 cm by 5 cm was prepared by an immersion in a hot (180 degrees Fahrenheit) alkaline cleaning solution for 10 minutes, rinse in water, immersion in a fifty percent by volume concentration of hydrochloric acid in water at 70 degrees Fahrenheit for 1 minute, rinse in water, and then immersion in the plating bath of the present invention at the parameters disclosed above. After 60 minutes of plating in this plating bath the panel was removed from the plating bath. The surface of the coating appeared as a uniform coated surface with a grayish-blue color. The coating on the panel was analyzed as follows.

A photomicrograph of a cross section of this coating at 1000-× magnification demonstrated a coating thickness of about 8 microns. Chemically dissolving the coating and weighing the PTFE incorporated in the coating compared to the weight and volume of the entire coating demonstrated about 24% of PTFE by volume in the coating.

The above bath representing the present invention was maintained at the conditions and parameters above for the subsequent plating of additional steel panels until the plating bath reached a total usage of 3 metal turnovers during which the plating rate remained essentially consistent, the PTFE in the plating bath remained well dispersed and did not exhibit any agglomeration, floating, or other signs of de-wetting; and the properties of the coating on these additional panels was consistent with the initial example, thereby demonstrating that the present invention is reproducible and commercially viable to an equal extent as the current state of the art yet free or essentially free of PFOA and PFOS.

Example 4

Medium Phosphorous Nickel-PTFE without PFOA

Dry PTFE particulate matter that is essentially free of PFOA (i.e. only trace amounts of PFOA in the PTFE) was dispersed into an aqueous solution containing a mixture of PMSs wherein one of said PMS's contains a fluorocarbon material that contains PFOS, resulting in a PTFE dispersion that is free of PFOA, but contains PFOS.

This PTFE dispersion was introduced into a medium phosphorous type electroless nickel composite plating bath in the amount of 6 grams of dispersion per liter of plating bath. The bath included a nickel salt providing a nickel metal concentration of 6 grams per liter in the plating bath, a reducing agent of sodium hypophosphite at a concentration of 30 grams per liter, and other components typical of electroless nickel baths, but free or essentially free of any PFOA or PFOS. The plating bath was operated at the parameters of pH 4.8-5.0, temperature of 90 degrees Celsius, and mild stirring agitation.

A steel panel measuring 2 cm by 5 cm was prepared by an immersion in a hot (180 degrees Fahrenheit) alkaline cleaning solution for 10 minutes, rinse in water, immersion in a fifty percent by volume concentration of hydrochloric acid in water at 70 degrees Fahrenheit for 1 minute, rinse in water, and then immersion in the plating bath of the present invention at the parameters disclosed above. After 60 minutes of plating in this plating bath the panel was removed from the plating bath. The surface of the coating appeared as a uniform coated surface with a silver-gray color. The coating on the panel was analyzed as follows.

A photomicrograph of a cross section of this coating at 1000-× magnification demonstrated a coating thickness of about 8 microns. Chemically dissolving the coating and weighing the PTFE incorporated in the coating compared to the weight and volume of the entire coating demonstrated about 22% of PTFE by volume in the coating.

The above bath representing the present invention was maintained at the conditions and parameters above for the subsequent plating of additional steel panels until the plating bath reached a total usage of 3 metal turnovers during which the plating rate remained essentially consistent, the PTFE in the plating bath remained well dispersed and did not exhibit any agglomeration, floating, or other signs of de-wetting; and the properties of the coating on these additional panels was consistent with the initial example, thereby demonstrating that the present invention is reproducible and commercially viable to an equal extent as the current state of the art yet free or essentially free of PFOA.

Example 5

High Phosphorous Nickel-PTFE without PFOA

Dry PTFE particulate matter that is essentially free of PFOA (i.e. understood in the art to be at most only trace amounts of PFOA in the PTFE) was dispersed into an aqueous solution containing a mixture of PMSs wherein one of said PMS's contains a fluorocarbon material that contains PFOS, resulting in a PTFE dispersion that is free of PFOA, but contains PFOS.

This PTFE dispersion was introduced into a high phosphorous type electroless nickel composite plating bath in the amount of 9 grams of dispersion per liter of plating bath. The bath included a nickel salt providing a nickel metal concentration of 6 grams per liter in the plating bath, a reducing agent of sodium hypophosphite at a concentration of 30 grams per liter, and other components typical of electroless nickel baths, but free or essentially free of any PFOA or PFOS. The plating bath was operated at the parameters of pH 4.8-5.0, temperature of 90 degrees Celsius, and mild stirring agitation.

A steel panel measuring 2 cm by 5 cm was prepared by an immersion in a hot (180 degrees Fahrenheit) alkaline cleaning solution for 10 minutes, rinse in water, immersion in a fifty percent by volume concentration of hydrochloric acid in water at 70 degrees Fahrenheit for 1 minute, rinse in water, and then immersion in the plating bath of the present invention at the parameters disclosed above. After 60 minutes of plating in this plating bath the panel was removed from the plating bath. The surface of the coating appeared as a uniform coated surface with a medium dark grayish-blue color. The coating on the panel was analyzed as follows.

A photomicrograph of a cross section of this coating at 1000-× magnification demonstrated a coating thickness of about 8 microns. Chemically dissolving the coating and weighing the PTFE incorporated in the coating compared to the weight and volume of the entire coating demonstrated about 28% of PTFE by volume in the coating.

The above bath representing the present invention was maintained at the conditions and parameters above for the subsequent plating of additional steel panels until the plating bath reached a total usage of 3 metal turnovers during which the plating rate remained essentially consistent, the PTFE in the plating bath remained well dispersed and did not exhibit any agglomeration, floating, or other signs of de-wetting; and the properties of the coating on these additional panels was consistent with the initial example, thereby demonstrating that the present invention is reproducible and commercially viable to an equal extent as the current state of the art yet free or essentially free of PFOA.

Example 6

High Phosphorous Nickel-PTFE without PFOS

Dry PTFE particulate matter that contains PFOA was dispersed into an aqueous solution containing a mixture of PMSs that do not contain PFOS, resulting in a PTFE dispersion that is free of PFOS.

This PTFE dispersion was introduced into a high phosphorous type electroless nickel composite plating bath in the amount of 6 grams of dispersion per liter of plating bath. The bath included a nickel salt providing a nickel metal concentration of 6 grams per liter in the plating bath, a reducing agent of sodium hypophosphite at a concentration of 30 grams per liter, and other components typical of electroless nickel baths, but free or essentially free of any PFOA or PFOS. The plating bath was operated at the parameters of pH 4.8-5.0, temperature of 90 degrees Celsius, and mild stirring agitation.

A steel panel measuring 2 cm by 5 cm was prepared by an immersion in a hot (180 degrees Fahrenheit) alkaline cleaning solution for 10 minutes, rinse in water, immersion in a fifty percent by volume concentration of hydrochloric acid in water at 70 degrees Fahrenheit for 1 minute, rinse in water, and then immersion in the plating bath of the present invention at the parameters disclosed above. After 60 minutes of plating in this plating bath the panel was removed from the plating bath. The surface of the coating appeared as a uniform coated surface with a grayish-blue color. The coating on the panel was analyzed as follows.

A photomicrograph of a cross section of this coating at 1000-× magnification demonstrated a coating thickness of about 8 microns. Chemically dissolving the coating and weighing the PTFE incorporated in the coating compared to the weight and volume of the entire coating demonstrated about 23% of PTFE by volume in the coating.

The above bath representing the present invention was maintained at the conditions and parameters above for the subsequent plating of additional steel panels until the plating bath reached a total usage of 3 metal turnovers during which the plating rate remained essentially consistent, the PTFE in the plating bath remained well dispersed and did not exhibit any agglomeration, floating, or other signs of de-wetting; and the properties of the coating on these additional panels was consistent with the initial example, thereby demonstrating that the present invention is reproducible and commercially viable to an equal extent as the current state of the art yet free or essentially free of PFOS.

Example 7

Medium Phosphorous Nickel-PTFE without PFOS

Dry PTFE particulate matter that contains PFOA was dispersed into an aqueous solution containing a mixture of PMSs that do not contain PFOS, resulting in a PTFE dispersion that is free of PFOS.

This PTFE dispersion was introduced into a medium phosphorous type electroless nickel composite plating bath in the amount of 6 grams of dispersion per liter of plating bath. The bath included a nickel salt providing a nickel metal concentration of 6 grams per liter in the plating bath, a reducing agent of sodium hypophosphite at a concentration of 30 grams per liter, and other components typical of electroless nickel baths, but free or essentially free of any PFOS. The plating bath was operated at the parameters of pH 4.8-5.0, temperature of 90 degrees Celsius, and mild stirring agitation.

A steel panel measuring 2 cm by 5 cm was prepared by an immersion in a hot (180 degrees Fahrenheit) alkaline cleaning solution for 10 minutes, rinse in water, immersion in a fifty percent by volume concentration of hydrochloric acid in water at 70 degrees Fahrenheit for 1 minute, rinse in water, and then immersion in the plating bath of the present invention at the parameters disclosed above. After 60 minutes of plating in this plating bath the panel was removed from the plating bath. The surface of the coating appeared as a uniform coated surface with a silver-gray color. The coating on the panel was analyzed as follows.

A photomicrograph of a cross section of this coating at 1000-× magnification demonstrated a coating thickness of about 7 microns. Chemically dissolving the coating and weighing the PTFE incorporated in the coating compared to the weight and volume of the entire coating demonstrated about 23% of PTFE by volume in the coating.

The above bath representing the present invention was maintained at the conditions and parameters above for the subsequent plating of additional steel panels until the plating bath reached a total usage of 3 metal turnovers during which the plating rate remained essentially consistent, the PTFE in the plating bath remained well dispersed and did not exhibit any agglomeration, floating, or other signs of de-wetting; and the properties of the coating on these additional panels was consistent with the initial example, thereby demonstrating that the present invention is reproducible and commercially viable to an equal extent as the current state of the art yet free or essentially free of PFOS.

I claim:

1. A method for electrolessly metalizing an object comprising the steps of:
   forming an electroless metalizing aqueous bath including no more than trace amounts of perfluorooctane sulfonate (PFOS) and further including a metal salt, a reducing agent, a complexing agent, and a dispersion of particulate matter;
   cleaning the surface of said object;
   controlling the temperature and pH of said electroless metalizing aqueous bath;
   immersing said object in said electroless metalizing aqueous bath for a duration to form a resultant metalized coating with an effective amount of polytetrafluoroethylene (PTFE) on said object; and
   removing said object from said electroless metalizing aqueous bath;
   wherein said dispersion of particulate matter includes PTFE particulate matter and at least one particulate matter stabilizer, and the concentration of said dispersion in said bath is in the range of 3-10 g/l.

2. The method of claim 1, wherein the resultant metalized coating on the object includes 20-30% PTFE.

3. The method of claim 1, wherein the metal in said metal salt is selected from the group consisting of nickel, cobalt, copper, gold, palladium, iron, other transition metals, and mixtures thereof, and metals deposited by an autocatalytic process.

4. The method of claim 1, wherein said dispersion of particulate matter contains Gen X or equivalent.

5. The method of claim 1, wherein the average size of said PTFE particulate matter is in the range of 0.05 to 100 microns.

6. The method of claim 1, wherein the average size of said PTFE particulate matter is in the range of is about 0.2 microns.

7. The method of claim 1, wherein any fluorocarbon materials in said bath have no chains of eight or longer.

8. The method of claim 1, wherein said bath is essentially free of perfluorooctanoic acid (PFOA).

9. The method of claim 1, wherein said bath is essentially free of lead.

10. The method of claim 1, wherein said bath is essentially free of cadmium.

11. The method of claim 1, wherein said bath contains particulate matter selected from a group consisting of diamond, silicon carbide, boron nitride (BN), aluminum oxide, graphite fluoride, tungsten carbide, talc, molybdenum disulfide ($MoS_2$), boron carbide, graphite, lubricating particles, wear resistant particles, and phosphorescent particles.

* * * * *